United States Patent
Schelhas et al.

(10) Patent No.: US 6,666,084 B2
(45) Date of Patent: Dec. 23, 2003

(54) METHOD FOR DETERMINING THE FLUID LEVEL OF A TANK IN MOTOR VEHICLES

(75) Inventors: Peter Schelhas, Stuttgart (DE); Klaus Marx, Stuttgart (DE); Hans Braun, Stuttgart (DE); Stefan Muelders, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/096,634

(22) Filed: Mar. 13, 2002

(65) Prior Publication Data

US 2002/0194910 A1 Dec. 26, 2002

(30) Foreign Application Priority Data

Mar. 13, 2001 (DE) .......................................... 101 11 923

(51) Int. Cl.$^7$ .............................................. G01F 23/00
(52) U.S. Cl. ..................................... 73/290 R; 73/291
(58) Field of Search ............................... 73/290 R, 291

(56) References Cited

U.S. PATENT DOCUMENTS 4,470,296 A * 9/1984 Kobayashi et al. ............ 73/113
4,890,491 A * 1/1990 Vetter et al. ............... 73/290 R

FOREIGN PATENT DOCUMENTS

DE  40 25 184    2/1992
DE  199 25 185   12/2000

OTHER PUBLICATIONS

Bosch, Automotive Handbook, 1999, pp. 103 to 109, 23$^{rd}$ edition.

* cited by examiner

Primary Examiner—Helen Kwok
Assistant Examiner—Rodney Frank
(74) Attorney, Agent, or Firm—Kenyon & Kenyon

(57) ABSTRACT

A method for determining the instantaneous fluid level of a tank includes the steps of: designating a beginning fluid-level of the tank as an input value during the starting of the engine; ascertaining a first fluid-level value from a fluid level measured by a fluid-level measuring device, and ascertaining a second fluid-level value and a window around the second fluid-level value from the consumption of the engine and from the input value; comparing the first fluid-level value to the window around the second fluid-level value; determining whether the first or the second fluid-level value should be a new input value; displaying the new input value as the fluid level; and terminating the method if the engine is switched off or repeating the method starting from the ascertaining step when the engine is running.

12 Claims, 4 Drawing Sheets

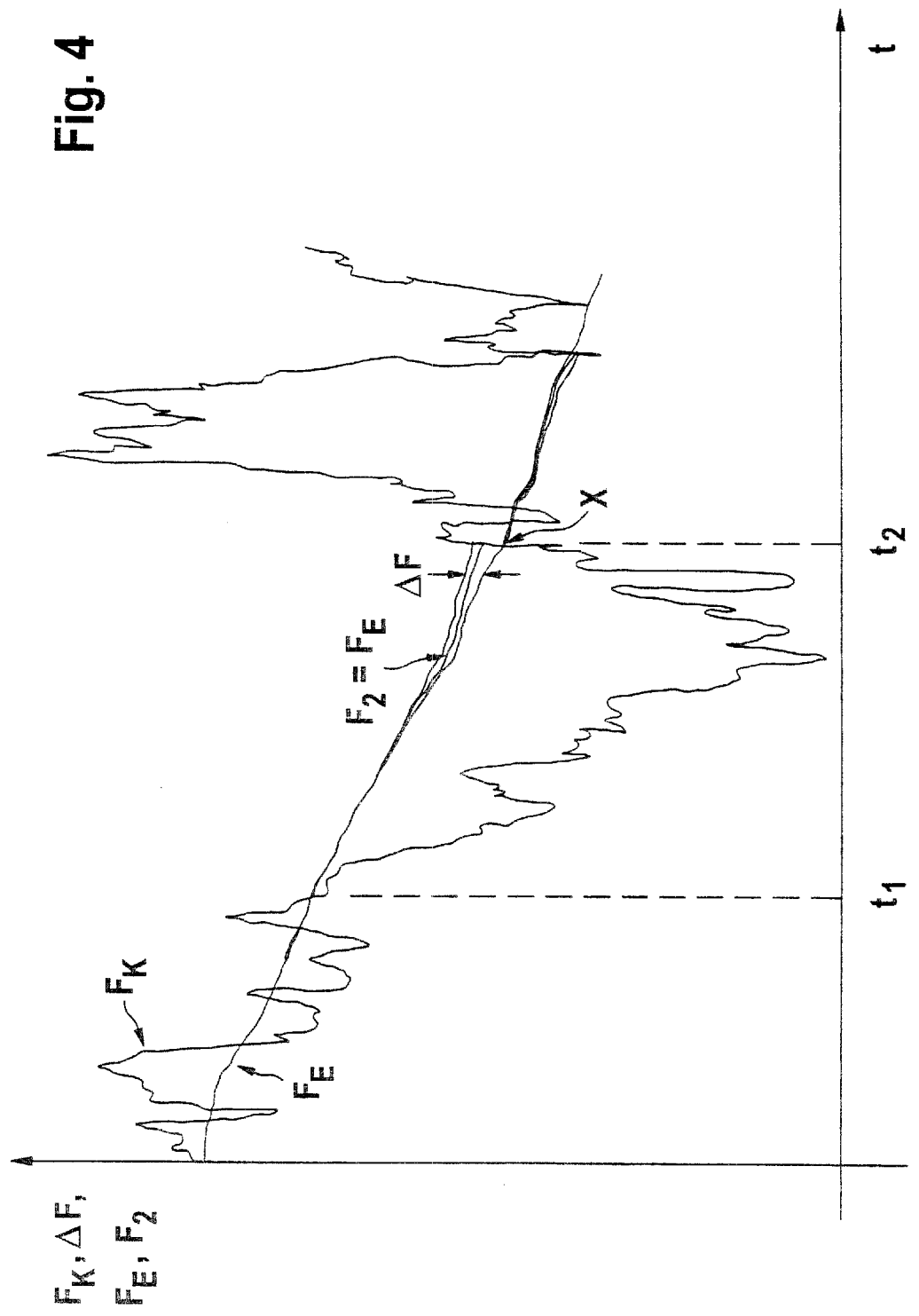

METHOD FOR DETERMINING THE FLUID LEVEL OF A TANK IN MOTOR VEHICLES

FIELD OF THE INVENTION

In modern motor vehicles, fluid-level measuring devices are used to measure the level of fuel (e.g., gasoline, diesel, etc.) in the fuel tank. The instantaneous fluid level is communicated to the driver by a display, so that he or she may estimate the expected range of the motor vehicle with the fuel remaining in the tank, as well as the necessity of filling up the tank.

BACKGROUND INFORMATION

Fluid-level measuring devices for tanks, where the floating member of a pivoted float floats in the region of the fluid level of the liquid in the tank in question, have been known for more than twenty years. The rotational axis of the float, which is normally below the highest possible liquid level, is connected to the input of a mechanical gear box, the output of which has a magnet mounted. The angular position of the float, which is a function of the level of the liquid, is transmitted to the magnet, whose angular position is therefore a measure of the fluid level. The magnet is situated near the outside of the tank. In other embodiments of fluid-level measuring devices, the rotational position of the magnet is detected through a housing wall, by a second pivoted magnet, which is mechanically coupled to a display device. This fluid-level measuring device is suitable for tanks in which flammable or explosive liquids are stored, for, in the case of the gearbox that is situated in the explosive region, no duct posing a problem with regard to imperviousness needs to pass through the tank wall. In other embodiments of fluid-level measuring devices, the magnet supported outside the tank interior is replaced by a magnetic-field sensor, which is connected to an electronic evaluation unit. This sensor detects the magnetic field, which is a function of the angular position of the magnet, is a measure of the fluid level, and can be converted to a fluid-level value with the aid of the evaluation unit.

German Published Patent Application No. 199 25 185 relates to a fluid-level measuring device for a tank, having a float pivoted about an axis of rotation, and having a tube, which possesses a first end and a second end, is set so that its second end extends to the outside of the tank, and is sealed with respect to the interior of the tank. A magnet is mounted in the region of the first end of the tube, and outside the tube on the rotational axis of the float. Situated opposite the magnet, in the interior of the tube, is a magnetic-field sensor which is set up to output a signal dependent on the angular position of the float, to an evaluation unit, via an electrical line.

A multi-sensor design, which allows data to be exchanged in a motor vehicle, via a data bus, is described in D. Sparks, T. Noll, D. Agrotis, T. Betzner, K. Gschwend, "Multi-Sensor Modules with Data Bus Communication Capability," SAE Technical Paper Series 1999-01-1277. A plurality of sensors in a housing is combined into a group. This multi-sensor module shares a single set of communication chips and thereby becomes an "intelligent" sensor network.

German Published Patent Application No. 40 25 184 relates to a sensor for measuring the acceleration or inclination, in particular for motor vehicles. It has a cylindrical fluid tank, which contains an electrically conductive fluid. Two electrodes coated with a dielectric extend from below, into the fluid tank. The electrodes and the conductive liquid function as a capacitor. The position of the sensor and, consequently, its inclination are ascertained from the capacitances of these capacitors.

Various acceleration sensors are known in the automotive field. According to the "Kraftfahrtechnischen Taschenbuch" (Automotive Handbook), Bosch, 23rd edition, Viehweg Publishing House (1999), pages 103 to 109, the followings sensors are, for example, suitable for monitoring acceleration in a turn, as well as changes in speed: inductive sensors, Hall-effect sensors, micromechanical silicon rpm sensors, Hall-effect accelerometers, piezoelectric sensors, or capacitive silicon accelerometers.

Devices and methods for ascertaining the instantaneous fuel consumption in a motor-vehicle engine are known.

The disadvantages of the above-described fluid-level measuring devices include that the measured values are invalidated by sloshing movements, in particular during the acceleration and deceleration of the motor vehicle, which are caused by curves and by driving on an incline, so that the fuel-level indicator displays values that are not correct or fluctuate sharply. In addition, inaccuracies caused by the float striking the bottom of the tank occur mainly in the residual-amount range.

SUMMARY

The present invention relates to a method for determining the instantaneous fluid level of a motor-vehicle tank, which includes the following steps: designating a beginning fluid level of the motor-vehicle tank as the input value, upon starting the motor-vehicle engine; ascertaining a first fluid-level value from a fluid level measured by a fluid-level measuring device, and ascertaining a second fluid-level value and a window around the second fluid-level value, from a consumption value of the motor-vehicle engine and from the input value; comparing the first fluid-level value to the window around the second fluid-level value; determining whether the first or the second fluid-level value should be a new input value; displaying the new input value as the fluid level; and terminating method if the motor-vehicle engine is switched off or repeating the method from the ascertaining step if the motor-vehicle engine is running.

The instantaneous fluid level means the fraction of the tank volume filled with fuel at a particular time. The beginning fluid level is the fluid level, which is ascertained from the fluid level measured by the fluid-level measuring device, immediately after the motor-vehicle engine is started, and which is subsequently used as an input value for the subsequent method steps until a new input value is obtained.

The fluid-level measuring device may be a conventional tank fluid-level measuring device and may include a fluid-level measuring device containing a float, which is pivoted about an axis of rotation, and the angular position of which is ascertained, for example, with the aid of a magnet and a magnetic-field sensor, or using a potentiometer. Fluid-level sensors, which measure the capacitance or the resistance between electrodes situated in the tank, may be provided. However, any other type of fluid-level measuring device is suitable for the present invention.

In the case of engines having fuel-injection, the consumption value of the motor vehicle, e.g., the instantaneous fuel consumption, may be determined.

In this context, a window around a fluid-level value means a range surrounding the fluid-level value, i.e., a range of values, which includes the fluid-level value itself and also the fluid-level value of larger and/or smaller surrounding values.

The new input value may be displayed as the current fluid-level, using a display already present in the motor vehicle. In this context, the display may be, for example, an analog display, which is situated in the driver-information area of the motor vehicle and is possibly a component of the instrument cluster.

If the motor-vehicle engine is switched off, the fluid level does not change. Therefore, it is superfluous to redetermine the fluid level of the tank.

The method according to the present invention may provide that the accuracy of the fluid-level display is increased, and that it is possible to more accurately determine the range of the motor vehicle. The accuracy is primarily increased by eliminating the effect of the dynamics of the tank contents on the display, especially in the case of sloshing and cornering. Inaccuracies, which may occur in the residual-amount range due to the float striking the bottom of the tank, may be largely eliminated. The measuring devices, sensors, and computers needed for implementing the method may already be present in the motor vehicle. The tank display only has to be expanded in the form of software. Additional hardware is not needed, which in turn has a positive effect on the cost of the method.

In an example embodiment of the present invention, the designation of the beginning fluid level of the motor-vehicle tank upon starting the motor-vehicle engine includes at least one of the following steps: measuring the fluid level, using the fluid-level measuring device; and correcting the measured fluid level.

The fluid level of the tank upon starting the motor-vehicle engine may be ascertained from a fluid-level measured by the above-described fluid-level measuring device. In so doing, one may start from the assumption that the motor vehicle is not moving while the engine is started, and therefore, errors in the measured fluid level caused by the dynamics of the tank contents may be ruled out. In addition, the determination of the fluid level upon starting the motor-vehicle engine may include a correction of the starting fluid level measured by the fluid-level measuring device, in particular a correction of measuring errors, which occur because of the inclination or banking of the motor vehicle. The inclination or banking of the motor vehicle causes the surface of the fuel in the tank to be inclined or banked, which may result in the measured fluid level being invalid. According to an example embodiment of the present invention, the measured fluid level may be corrected with the aid of information regarding the position of the motor vehicle. This information may include the inclination or banking of the motor vehicle, these two quantities being measured by at least one sensor. Sensors for acquiring information regarding the position of the motor vehicle which are already integrated into the motor vehicle may be used.

In an example embodiment of the present invention, the determination of the fluid-level value from the fluid level measured by the fluid-level measuring device includes at least one of the following three steps: measuring the fluid level, using the fluid-level measuring device; correcting the measured fluid level; and calculating the moving average.

Any type of fluid-level measuring device may be provided as a fluid-level measuring device. The measured fluid level may be corrected with the aid of information regarding the position of the motor vehicle and/or the acceleration. In this context, the information regarding the position of the motor vehicle may include the inclination or the banking of the motor vehicle, these two quantities being measured by at least one sensor. The necessary sensors for monitoring the position of the motor vehicle and acquiring acceleration information may already be included in modern vehicles, e.g., the vehicle-position sensors or acceleration sensors necessary for operating-dynamics systems such as ESP, or for headlight-leveling devices. The effect of the vehicle position and the acceleration on the fluid-level measuring device may be corrected by correction algorithms. The correction algorithms are based on, inter alia, knowledge of the curve of the fluid level measured by the fluid-level measuring device versus the vehicle position and the acceleration. The correction of the measured fluid level allows one to calculate back to the fluid level that the vehicle would have on a flat surface. Due to this arithmetic correction, the fact that the vehicle is driving uphill or downhill, is in a banked position, or is in an acceleration phase no longer has an effect on the ascertained, first fluid-level value. However, the corrected fluid level obtained in this manner is subject to fluctuations, such as sloshing, which may be attributed to the dynamics of the tank contents. By calculating a moving average, these fluctuations may be compensated for to a certain extent, over a long period of time, but they may not be eliminated completely. In this context, a moving average is to be understood as an average value, which is calculated using the values in a defined interval occurring prior to the currently measured value. This is a curve-smoothing method, which smooths out peaks and outliers. There are various manner of calculating moving averages, so that the result may be an arithmetic, an exponentially weighted, a linearly weighted, or a quadratically weighted, moving average.

According to an example embodiment of the present invention, the determination of the second fluid-level value and the window around the second fluid-level value includes the following steps: determining the consumption by integrating the instantaneous consumption; calculating the second fluid-level value by subtracting the consumption from the input value; and calculating the window around the second fluid-level value, from the errors in determining the consumption.

The information regarding the instantaneous consumption already exists for engines having fuel injection. The instantaneous consumption is integrated to determine the absolute consumption, which is subtracted from the input value in order to calculate the second fluid-level value. In this context, the input value is either the measured (and possibly corrected) fluid level directly after starting the motor vehicle, or the last fluid level displayed on the fluid-level display. The window is calculated from the error in determining the consumption. This error increases with time, due to the summing up of small quantities (integration). This window defines the range, in which the fluid level of the motor-vehicle tank actually lies. It is limited by the greatest and least possible fluid level resulting from the greatest possible error.

A more accurate fluid level, which is displayed by the fluid-level display and used as a new input value, results from combining the first and second fluid-level values, i.e., from combining the corrected, measured fluid level and the instantaneous-consumption information. In this context, it is useful for the first fluid-level value to be the new input value, if the first fluid-level value is in the window surrounding the second fluid-level value. It is useful for the second fluid-level value to be the new input value, if the first fluid-level value is outside the window surrounding the second fluid-level value. In the first case, the window becomes very small in the next loop of the method, since the fluid-level value is assumed to be exact and the calculation of the absolute consumption starts out from this new, "exact" input value. In the second case, the window becomes larger in the next loop of the method, since the integration of the instantaneous consumption is continued, thereby increasing the error. The error, which results from the consumption calculation and increases with time, is kept as small as possible by the combination with the corrected, measured value of the fluid-level measuring device.

In the present multi-sensor principle, which combines the measured values of the fluid-level measuring device, the inclination and banking sensors, the acceleration sensors, and the sensors for determining instantaneous consumption, it may be provided that, in order to implement the method of the present invention, a modern motor vehicle only needs to be expanded in the form of software. Additional hardware is not required, since the necessary components may already be present in the motor vehicle. The required calculations and correction algorithms may be performed by computers already arranged in the vehicle, e.g., by the engine control unit or the control unit of the instrument cluster.

The driver of the motor vehicle is informed of the fluid level of the motor-vehicle tank by suitable display instruments, which are connected to the above-mentioned computers. In an example embodiment of the present invention, the display is a digital display. This was previously not possible, since the displayed fluid level fluctuated too sharply, and therefore, a digital display would have been difficult to read. The more exact fluid level ascertained according to the present invention fluctuates much less, and a digital display is therefore possible.

In an example embodiment of the present invention, the expected range of the motor vehicle resulting from the current fluid level is displayed. The more accurate knowledge of the fluid level of the motor-vehicle tank also increases the accuracy of the expected range. In this context, the range of a motor vehicle may be understood as the distance that may be traveled, using the fuel remaining in the motor-vehicle tank.

As an alternative to the above-described methods, the fluid-level measuring error resulting from the vehicle position may be corrected by skillfully installing one or more fuel-level sensors as a fluid-level measuring device. In the case of a symmetric tank, an example embodiment of the present invention provides for a centrally situated fuel-level sensor being used as a fluid-level measuring device. In this context, at the central position, an inclination of the upper fuel surface has the least effect on the measured fluid level. In the case of a saddle tank, a further example embodiment of the present invention provides for at least two fuel-level sensors, which are situated in the two chambers and used as a fluid-level measuring device.

In addition, the present invention relates to the use of the method for checking the functionality of the fluid-level measuring device, where, in each run-through of the method, the frequency of the first fluid-level value being inside the window surrounding the second fluid-level value is checked after comparing the first fluid-level value to the window. If the first fluid-level value is frequently in the window, then the calculated fluid level and the fluid level measured by the fluid-level measuring device are in agreement, and the fluid-level measuring device is working. If the values are rarely in agreement, then it may be assumed that the fluid-level measuring device is defective.

BRIEF DESCRIPTION OF THE DRAWINGS

FIG. 4 is an enlarged detail of the fluid-level curve illustrated in FIG. 3.

DETAILED DESCRIPTION

Figure 1:
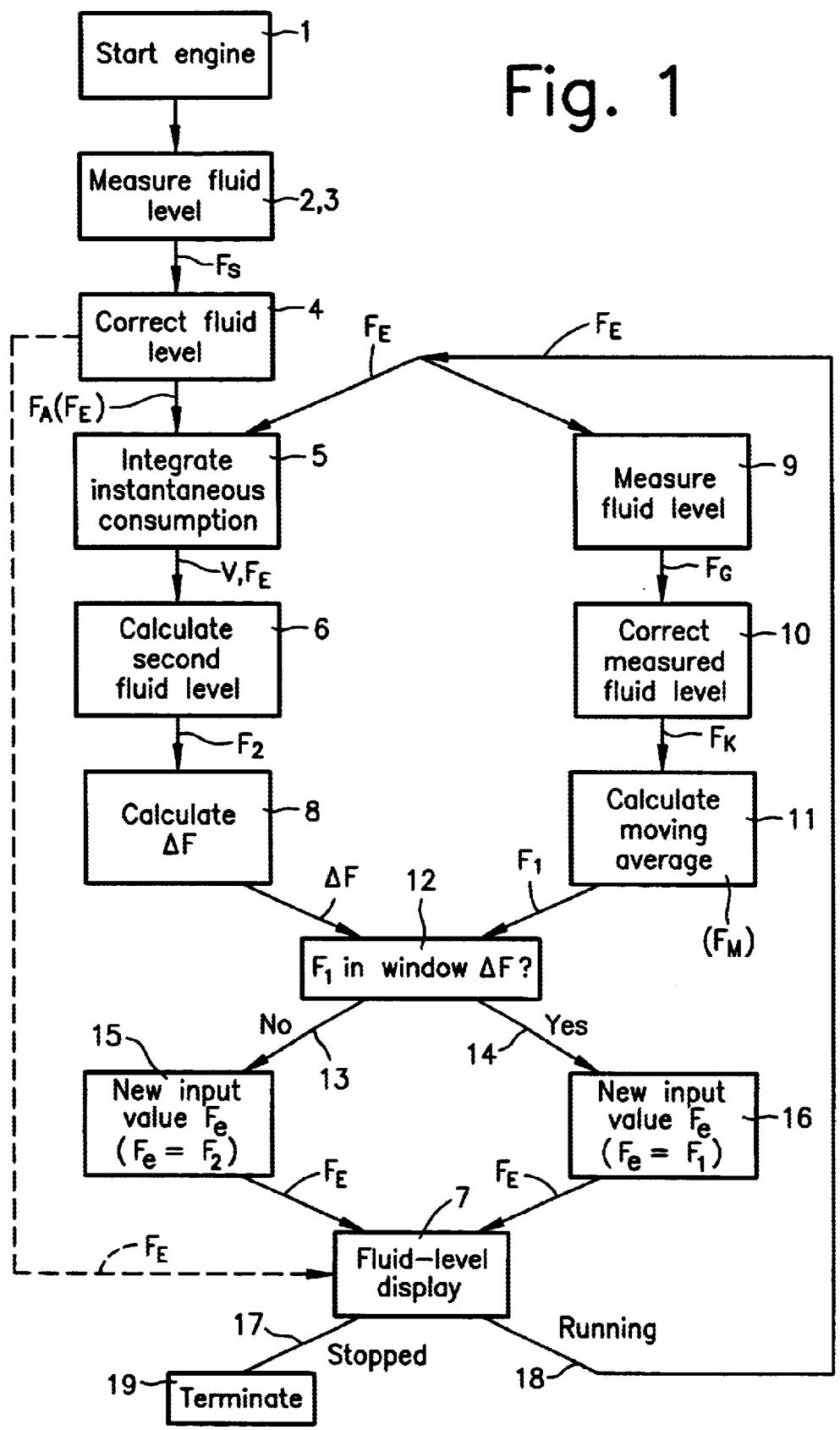
FIG. 1 is a flow chart of a method according to the present invention.

FIG. 1 illustrates a flow chart of a method according to the present invention.

The starting fluid level in the motor-vehicle tank is measured 2 by a fluid-level measuring device 3 immediately after the motor-vehicle engine is started 1. Measured, starting fluid level $F_S$ is corrected 4 on the basis of information regarding the motor-vehicle position, thereby yielding beginning fluid level $F_A$, which is used as an input value $F_E$. Input value $F_E$ may be transmitted to fluid-level display 7, so that it displays input value $F_E$ as the instantaneous fluid level. Second fluid level F2 may be calculated 6 from input value $F_E$, by integrating 5 the instantaneous consumption. A window $\Delta F$ around second fluid-level value F2 is calculated 8 from error $\Delta F$ of consumption V, which results from integrating the instantaneous consumption. Parallel to ascertaining second fluid-level value F2 and window $\Delta F$, first fluid-level value $F_1$ is ascertained by measuring 9 the fluid-level with a fluid-level measuring device, correcting 10 measured fluid-level $F_G$ on the basis of information ($F_K$) regarding the vehicle position and acceleration, and by calculating 11 moving average ($F_M$). The moving average $F_M$ calculated is first fluid-level value $F_1$. In the subsequent case differentiation 12, it is checked if first fluid-level value $F_1$ is in window $\Delta F$. In first case 13, first fluid-level value $F_1$ is not in window $\Delta F$, and second fluid-level value $F_2$ is used as the new input value $F_E$ ($F_E=F_2$) 15. In second case 14, first fluid-level $F_1$ is inside window $\Delta F$, and first fluid-level value $F_1$ is used as the new input value $F_E$ ($F_E=F_1$) 16. Fluid-level display 7 displays new input value $F_E$ as the current fluid-level. The method is then terminated 19 if the motor-vehicle engine is stopped 17, and, if the motor-vehicle engine is running 18, the method is restarted, with the parallel determination of first and second fluid-level values ($F_1$, $F_2$) being repeated. This procedure is repeated for as long as the motor vehicle is running.

Figure 2:
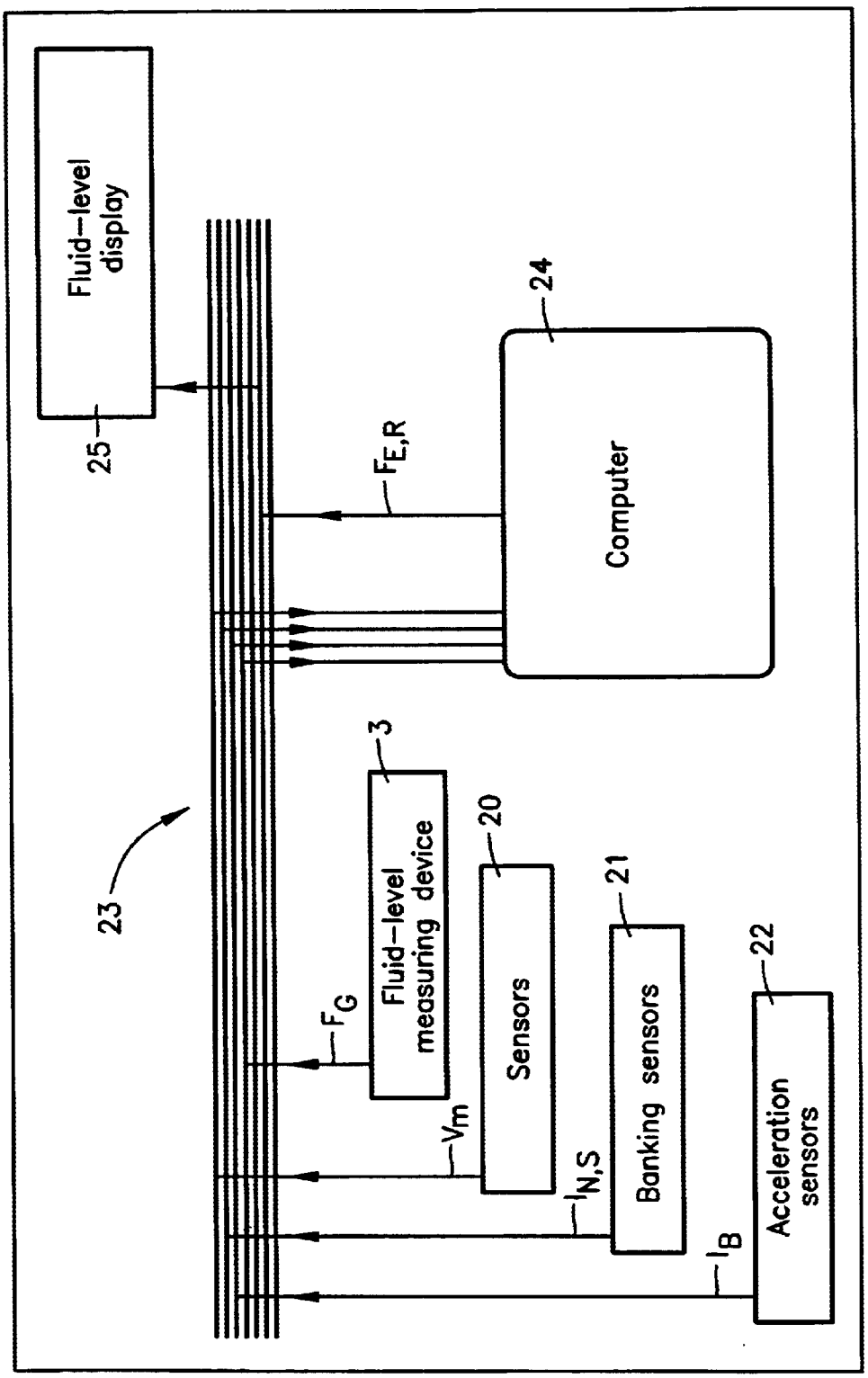
FIG. 2 is a schematic view of an arrangement configured to implement the method of the present invention in accordance with a multi-sensor configuration.

FIG. 2 illustrates schematically an arrangement configured to implement the method of the present invention in accordance with a multi-sensor configuration.

A fluid-level measuring device 3, sensors 20 for determining the instantaneous consumption, inclinometers and banking sensors 21, and acceleration sensors 22 are connected to an information path 23 present in the motor vehicle, e.g., to a CAN bus. The measured values of the sensors, i.e., measured fluid level $F_G$, instantaneous consumption $V_m$, inclination and banking information $I_{N,S}$, and/or acceleration information $I_B$ are transmitted via information path 23 to a computer 24. Computer 24 may be, for example, a control unit of the instrument cluster or the engine control unit. Computer 24 performs the necessary calculations and correction algorithms. This includes the correction of the fluid level $F_G$ measured by fluid-level measuring device 3, based on the information regarding the inclined/banked position and/or the acceleration ($I_{N,S}$, $I_B$). The calculation of moving average $F_M$ is also a task of computer 24. In addition, computer 24 is used to integrate instantaneous consumption $V_m$ and calculate second fluid-level value $F_2$ and window $\Delta F$. After case differentiation 12 has taken place, a new input value $F_E$ and possibly the calculated range R are transmitted by computer 24, via information path 23, to fluid-level display (and/or range display) 25.

Figure 3:
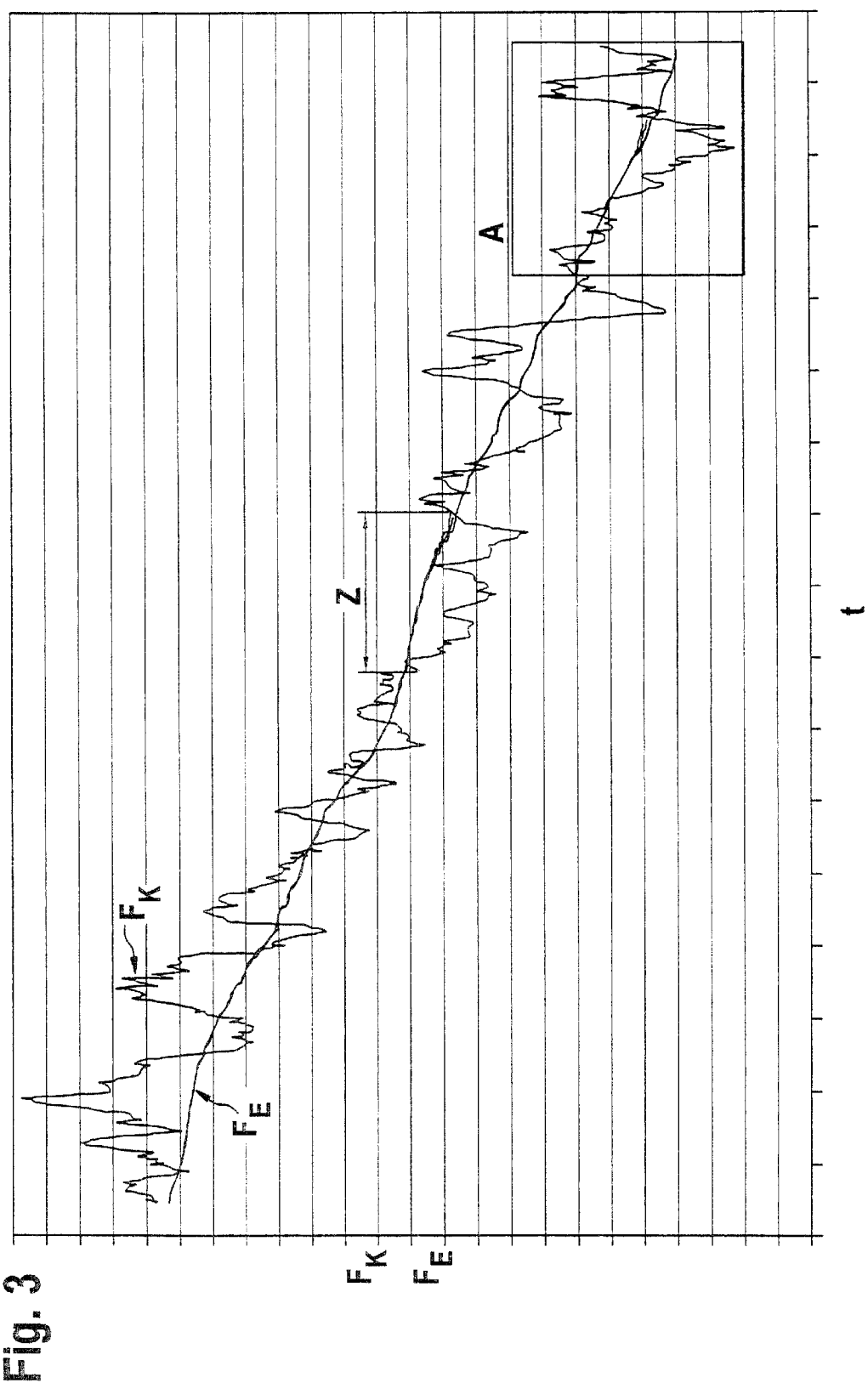
FIG. 3 is an example of the fluid-level curve ascertained using the method of the present invention.

FIG. 3 illustrates an example of the fluid-level curve ascertained using the method of the present invention.

The characteristics of corrected fluid level $F_K$ measured by the fluid-level measuring device and input value $F_E$ displayed by the fluid-level display are represented as a function of time t. Corrected, measured fluid level $F_K$ markedly fluctuates on the order of several liters. These fluctuations are a result of the dynamics of the tank contents. Input value $F_E$, which results from the method of the present invention and is communicated to the motor-vehicle driver by the fluid-level display, is smoother. Input value $F_E$ intersects corrected, measured fluid level $F_K$ at many points. Using the multi-sensor configuration that includes a fluid-level measuring device, instantaneous consumption measurement, and banking and inclination sensors or acceleration sensors, the input value $F_E$ displayed by the fluid-level display achieves an accuracy of ±1 l. The effect of the dynamics of the tank contents on corrected, measured fluid level $F_K$, especially in the case of sloshing and cornering, is eliminated by the method of the present invention, in particular through consideration of the instantaneous consumption.

If there is a longer period of time between two intersections of corrected, measured fluid level $F_K$ with the maximum or minimum value of the window $\Delta F$ around 2nd fluid-level value $F_2$, such as time period Z, then one may recognize a widening of error window $\Delta F$ around 2nd fluid-level value $F_2$. $F_2$ is input value $F_E$ inside this time period Z. Window $\Delta F$ shall be explained in detail with the aid of FIG. 4.

FIG. 4 illustrates enlarged detail A illustrated in FIG. 3. Between time t1 and time t2, corrected, measured fluid level $F_K$ does not intersect the maximum or minimum value of the window $\Delta F$ around 2nd fluid-level value $F_2$. In this range, it may be discerned that window $\Delta F$ widens around $F_2$, since the errors caused by the integration of the instantaneous consumption increase. The errors increase as long as second fluid-level value $F_2$ is taken as input value $F_E$. First fluid-level value $F_1$ is only taken as the input value $F_E$, and the consumption error is only set to zero, in the case of an intersection, when first fluid-level value $F_1$ is in window $\Delta F$. This is visible at point X. The width of window $\Delta F$ is reset to zero at this point X.

The following is a list of reference numerals used in conjunction with the present invention:

| | |
|---|---|
| 1 | starting of the motor-vehicle engine |
| 2 | measurement of the starting fluid level |
| 3 | fluid-level measuring device |
| 4 | correction of the measured, starting fluid level. |
| 5 | integration of the instantaneous consumption |
| 6 | calculation of the second fluid-level value |
| 7 | fluid-level display |
| 8 | calculation of a window around the second fluid-level value |
| 9 | measurement of the fluid level |
| 10 | correction of the measured fluid level |
| 11 | calculation of the moving average |
| 12 | case differentiation |
| 13 | first case: $F_1$ is not in $\Delta F$ |
| 14 | second case: $F_1$ is in $\Delta F$ |

-continued

| | |
|---|---|
| 15 | $F_E = F_2$ |
| 16 | $F_E = F_1$ |
| 17 | motor-vehicle engine stopped |
| 18 | motor-vehicle engine running |
| 19 | method terminated |
| 20 | sensors for ascertaining the instantaneous consumption |
| 21 | inclination and banking sensors |
| 22 | acceleration sensors |
| 23 | information path |
| 24 | computer |
| 25 | fluid-level display and/or range display |
| A | detail |
| $F_A$ | beginning fluid level |
| $F_E$ | input value |
| $F_G$ | measured fluid level |
| $F_K$ | corrected, measured fluid level |
| $F_M$ | floating average |
| $F_S$ | starting fluid level |
| $F_1$ | first fluid-level value |
| $F_2$ | second fluid-level value |
| $\Delta F$ | window |
| $I_B$ | acceleration information |
| $I_{N,S}$ | inclination and banking information |
| R | range |
| t | time |
| V | consumption |
| $V_m$ | instantaneous consumption |
| $\Delta V$ | consumption error |
| Z | time period |

What is claimed is:

1. A method for determining an instantaneous fluid level of a motor-vehicle tank, comprising the steps of:
   A) designating a beginning fluid-level of the motor-vehicle tank as an input value during a starting of a motor-vehicle engine;
   B) ascertaining a first fluid-level value from a fluid level measured by a fluid-level measuring device, and ascertaining a second fluid-level value and a window around the second fluid-level value from a fuel consumption value of the motor-vehicle engine and from the input value;
   C) determining whether the first fluid-level value is inside the window around the second fluid-level value;
   D) determining whether the first fluid-level value or the second fluid-level value is a new input value based on whether or not the first fluid-level value is inside the window around the second fluid-level value;
   E) displaying the new input value as the fluid level; and
   F) one of terminating the method if the motor-vehicle engine is shut off and repeating the steps A) to E) if the motor-vehicle engine is running.

2. The method according to claim 1, wherein step A) includes at least one of the substeps of measuring a starting fluid level using the fluid-level measuring device and correcting the measured fluid level.

3. The method according to claim 1, wherein step B) include at least one of substeps of measuring the fluid level using the fluid-level measuring device, correcting the measured fluid level, and calculating a moving average.

4. The method according to claim 2, wherein the correcting step is performed in accordance with information regarding at least one of a motor-vehicle position and an acceleration.

5. The method according to claim 4, wherein the information regarding the motor-vehicle position includes at least one of an inclination and a banking of the motor-vehicle, the method further comprising the step of monitoring the at least one of the inclination and the banking by at least one sensor.

6. The method according to claim 1, wherein the second fluid-level value and window ascertaining step includes the substeps of:
- calculating a fuel consumption by integrating an instantaneous fuel consumption;
- calculating the second fluid-level value by determining a difference of the input value and the fuel consumption; and
- calculating the window around the second fluid-level value from errors in the fuel consumption calculating step.

7. The method according to claim 1, wherein the first fluid-level value is the new input value if the first fluid-level value is in the window around the second fluid-level value and the second fluid-level value is the new input value if the first fluid-level value is outside the window around the second fluid-level value.

8. The method according to claim 1, wherein the display includes a digital display.

9. The method according to claim 1, further comprising the step of displaying a range of the motor vehicle resulting from a current fluid level.

10. The method according to claim 1, wherein the fluid-level measuring device includes a centrally arranged fuel-level sensor in a symmetric tank.

11. The method according to claim 1, wherein the fluid-level measuring device includes at least two fuel-level sensors arranged in two chambers of a saddle tank.

12. A method for determining an instantaneous fluid level of a motor-vehicle tank, comprising:

A) designating a beginning fluid-level of the motor-vehicle tank as an input value during a starting of a motor-vehicle engine;

B) ascertaining a first fluid-level value from a fluid level measured by a fluid-level measuring device, and ascertaining a second fluid-level value and a window around the second fluid-level value from a consumption value of the motor-vehicle engine and from the input value;

C) comparing the first fluid-level value to the window around the second fluid-level value;

D) determining whether the first fluid-level value or the second fluid-level value is a new input value;

E) displaying the new input value as the fluid level;

F) one of terminating the method if the motor-vehicle engine is shut off and repeating the steps A) to E) if the motor-vehicle engine is running; and checking how frequently the first fluid-level value is inside the window for each loop after the comparing step, to determine a functionality of the fluid-level measuring device.

* * * * *